United States Patent
Son

(10) Patent No.: US 10,594,350 B2
(45) Date of Patent: Mar. 17, 2020

(54) METHOD OF RECOGNIZING FLIP COVER OF ELECTRONIC DEVICE, ELECTRONIC DEVICE, AND FLIP COVER

(71) Applicant: Samsung Electronics Co., Ltd., Gyeonggi-do (KR)

(72) Inventor: Je-Hyun Son, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/044,960

(22) Filed: Feb. 16, 2016

(65) Prior Publication Data

US 2016/0241687 A1 Aug. 18, 2016

(30) Foreign Application Priority Data

Feb. 16, 2015 (KR) .................... 10-2015-0023428

(51) Int. Cl.
| | | |
|---|---|---|
| H04B 1/3888 | (2015.01) | |
| G06F 3/046 | (2006.01) | |
| H04M 1/725 | (2006.01) | |

(52) U.S. Cl.
CPC .......... *H04B 1/3888* (2013.01); *G06F 3/046* (2013.01); *H04M 1/72575* (2013.01); *H04M 2250/22* (2013.01)

(58) Field of Classification Search
CPC ............ H04B 1/3888; H04M 1/72575; H04M 2250/22; G06F 3/046
USPC ............................................. 455/575.8, 575.1
See application file for complete search history.

(56) References Cited

U.S. PATENT DOCUMENTS

| | | | | |
|---|---|---|---|---|
| 2008/0238885 | A1* | 10/2008 | Zachut ................ | G06F 3/03545 345/174 |
| 2012/0072167 | A1* | 3/2012 | Cretella, Jr. .......... | G06F 1/1626 702/150 |
| 2013/0015079 | A1 | 1/2013 | Arzoumanian | |
| 2013/0328825 | A1* | 12/2013 | Brown ...................... | G06F 3/01 345/174 |
| 2014/0139989 | A1 | 5/2014 | Mori et al. | |
| 2015/0155903 | A1* | 6/2015 | Jang ..................... | H04B 1/3888 455/575.8 |
| 2015/0372721 | A1* | 12/2015 | Bard ................... | H04B 5/0075 455/575.8 |

* cited by examiner

*Primary Examiner* — Yuwen Pan
*Assistant Examiner* — Fatuma G Sherif

(57) ABSTRACT

An electronic device, according to various embodiments of the present disclosure, includes: a digitizer that operates in an Electro-Magnetic Resonance (EMR) detection scheme; a flip cover that includes a resonance circuit; and a controller, wherein the controller determines the type of the flip cover by identifying at least one of a resonant frequency of a resonance signal output from the resonance circuit and the location of the resonance signal recognized by the digitizer. Other embodiments can be made.

10 Claims, 12 Drawing Sheets

METHOD OF RECOGNIZING FLIP COVER OF ELECTRONIC DEVICE, ELECTRONIC DEVICE, AND FLIP COVER

CROSS-REFERENCE TO RELATED APPLICATION AND CLAIM OF PRIORITY

The present application is related to and claims benefit under 35 U.S.C. § 119(a) to Korean Application Serial No. 10-2015-0023428, which was filed in the Korean Intellectual Property Office on Feb. 16, 2015, the entire content of which is hereby incorporated by reference.

TECHNICAL FIELD

Various embodiments of the present disclosure relate to a method of recognizing a flip cover of an electronic device, an electronic device, and a flip cover.

BACKGROUND

Covers of electronic devices, such as smart phones, tablet PCs, and the like, are used to safely protect the electronic devices from external impacts. However, these days, the covers of electronic devices are used as accessories to express users' individuality. In addition, there have been recently developed technologies for implementing various functions in covers along with technologies for implementing various functions in electronic devices. For example, as illustrated in FIGS. 11A and 11B, a flip cover, constituted by a front cover 1112 that covers a digitizer, that is provided on the front side of an electronic device 1100, and a rear cover 1114 that covers the rear side of the electronic device 1100, may include a magnetic element 1118, and the electronic device 1100 may identify whether the front side thereof is covered with the flip cover, using a Hall integrated circuit 1130 of the electronic device 1100.

For instance, in the case of a flip cover that has contact type terminals 1215 and an embedded integrated circuit 1217 for identifying an ID as illustrated in FIG. 12, an electronic device may, for example, identify whether the flip cover is a genuine product through the electronic device and the contact type terminals 1215 of the flip cover.

SUMMARY

In the related art, an electronic device may make contact with a contact type terminal of a flip cover through a contact type terminal thereof to identify whether the flip cover is a genuine product or not. The flip cover in the related art has an aesthetic problem when the flip cover is opened, and has other problems, such as contact failure of the contact type terminal, damage to the contact type terminal due to repetitive attachment and detachment of the flip cover, and the like. Also, for example, an electronic device, such as a conventional tablet PC, which has a structure that is designed not to expose a contact type terminal, cannot identify whether a flip cover is a genuine product or not through the above-described method in the related art.

To address the above-discussed deficiencies, it is a primary object to provide a method of recognizing a flip cover of an electronic device, an electronic device, and a flip cover in which the electronic device can identify the type of flip cover mounted thereon. Furthermore, various embodiments of the present disclosure provide a method of recognizing a flip cover of an electronic device, an electronic device, and a flip cover in which the electronic device that is designed such that a contact type terminal is not exposed can identify the type of flip cover mounted thereon.

According to various embodiments of the present disclosure, an electronic device may include: a digitizer that operates in an Electro-Magnetic Resonance (EMR) detection scheme; a flip cover that includes a resonance circuit; and a controller, wherein the controller may determine the type of the flip cover by identifying at least one of a resonant frequency of a resonance signal output from the resonance circuit and the location of the resonance signal recognized by the digitizer.

According to various embodiments of the present disclosure, a method of recognizing a flip cover of an electronic device may include: detecting at least one of a resonant frequency of a resonance signal output from a resonance circuit of the flip cover that is located adjacent to the electronic device and the location of the resonance signal recognized by a digitizer of the electronic device; and determining the type of the flip cover of the electronic device by using at least one of the resonant frequency of the resonance signal output from the resonance circuit and the location of the resonance signal recognized by the digitizer.

According to various embodiments of the present disclosure, a flip cover may include a front cover that covers a digitizer provided on the front side of an electronic device, wherein the front cover may include a resonance circuit that has a structure for generating a resonance signal that is detected by the digitizer of the electronic device.

According to the method of recognizing a flip cover of an electronic device, the electronic device, and the flip cover in the various embodiments of the present disclosure, the electronic device can identify the type of a flip cover mounted thereon. Furthermore, the electronic device that is designed such that a contact type terminal is not exposed can identify the type of a flip cover mounted thereon. In addition, it is possible to minimize or remove contact type terminals of the electronic device and the flip cover and to manufacture the external design of the flip cover and the electronic device in a more simple and convenient manner.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
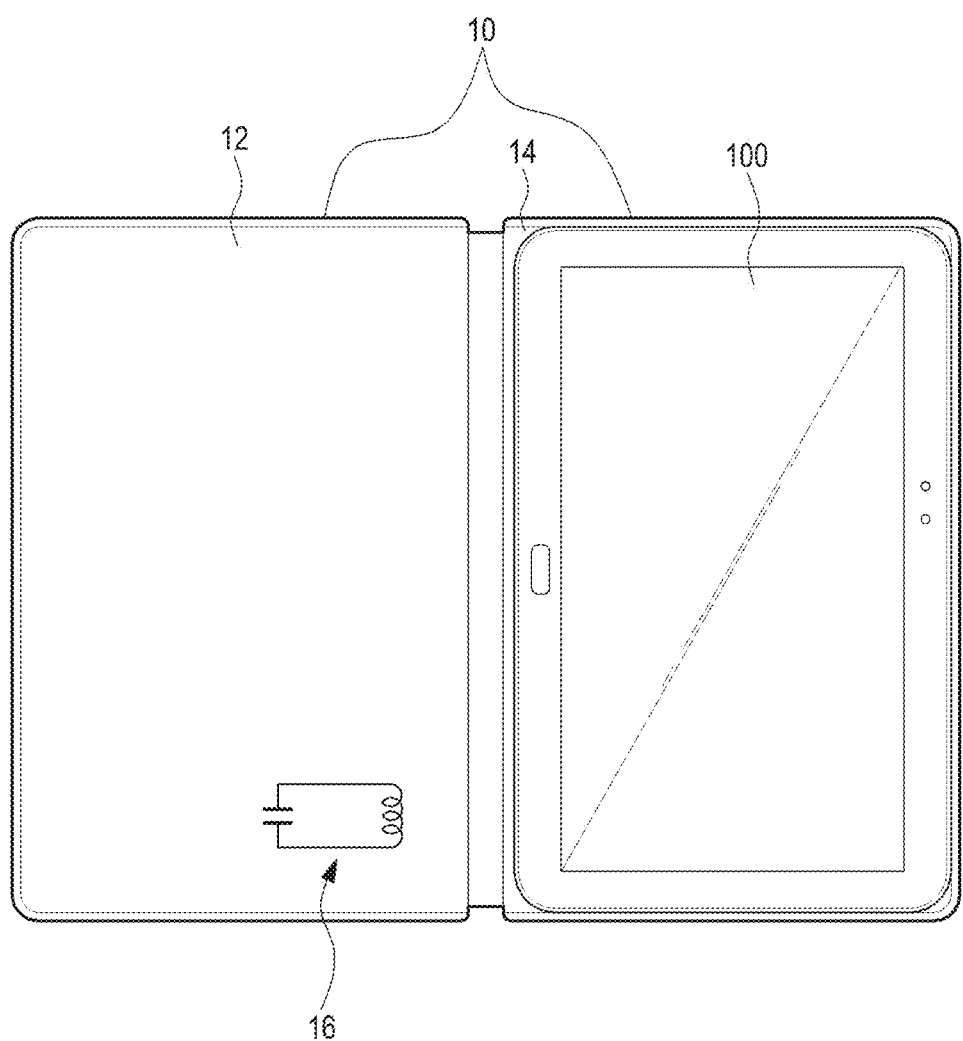
FIG. 1 illustrates a flip cover according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments of the present disclosure will be described in connection with the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In the description of the drawings, identical or similar reference numerals are used to designate identical or similar elements.

Hereinafter, the terms "include" or "may include", which may be used in various embodiments of the present disclosure, refer to the presence of disclosed functions, operations or elements, and do not restrict the addition of one or more functions, operations or elements. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expressions such as "first," "second," or the like used in various embodiments of the present disclosure may modify various component elements in the various embodiments but may not limit corresponding component elements. For example, the above expressions do not limit the sequence and/or importance of the elements. The above expressions are used merely for the purpose of distinguishing an element from the other elements. For example, a/first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms in various embodiments of the present disclosure are used to describe a specific embodiment, and are not intended to limit the present disclosure. As used herein, the singular forms are intended to include the plural foul's as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HOMESYNC™ of SAMSUNG™, APPLE TV™, or GOOGLE TV™), game consoles, electronic dictionaries, electronic keys, camcorders, or electronic frames.

According to some embodiments, the electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recorder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, ATM (automatic teller machine) in banking facilities or POS (point of sales) in stores.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

The term "user" used in various embodiments may refer to a person who uses an electronic device or a device (for example, an artificial intelligence electronic device) that uses an electronic device.

FIG. 1 illustrates a flip cover according to an embodiment of the present disclosure. Referring to FIG. 1, the flip cover 10 may include a front cover 12 that covers a digitizer formed on the front side of an electronic device 100 and a rear cover 14 that covers the rear side of the electronic device 100. The rear cover 14 of the flip cover 10 may be coupled to the rear side of a battery cover (not illustrated) that covers a battery (not illustrated) provided on the rear side of the electronic device 100. Alternatively, the rear cover 14 of the flip cover 10 may be coupled to the rear side of the electronic device 100 while covering the battery provided on the rear side of the electronic device 100. Meanwhile, the battery may be provided on the rear side of the electronic device 100 to supply electric power to the electronic device 100. The battery may be provided on the rear side of the electronic device 100 such that a user can attach/detach the battery to/from the electronic device, or may be embedded in the electronic device 100 such that the user cannot attach/detach the battery to/from the electronic device.

The front cover 12 of the flip cover 10 may include a resonance circuit 16 that has a structure for generating a resonance signal that is detected by the digitizer of the electronic device 100. The resonance circuit 16 may be operated by a specified resonant frequency, for example, by a resonance signal of about 600 KHz, and the resonant frequency may be formed by adjusting the value of an LC element of the resonance circuit 16.

For example, when the flip cover 10, which includes the resonance circuit 16, enters a region where a resonance signal configured with a resonant frequency in a specified resonant frequency band is generated, the resonance circuit 16 of the flip cover 10 may generate an induced electromotive force by using the resonance signal configured with the resonant frequency in the specified resonant frequency band, and may output a resonance signal at the specified resonant frequency.

Figure 2:
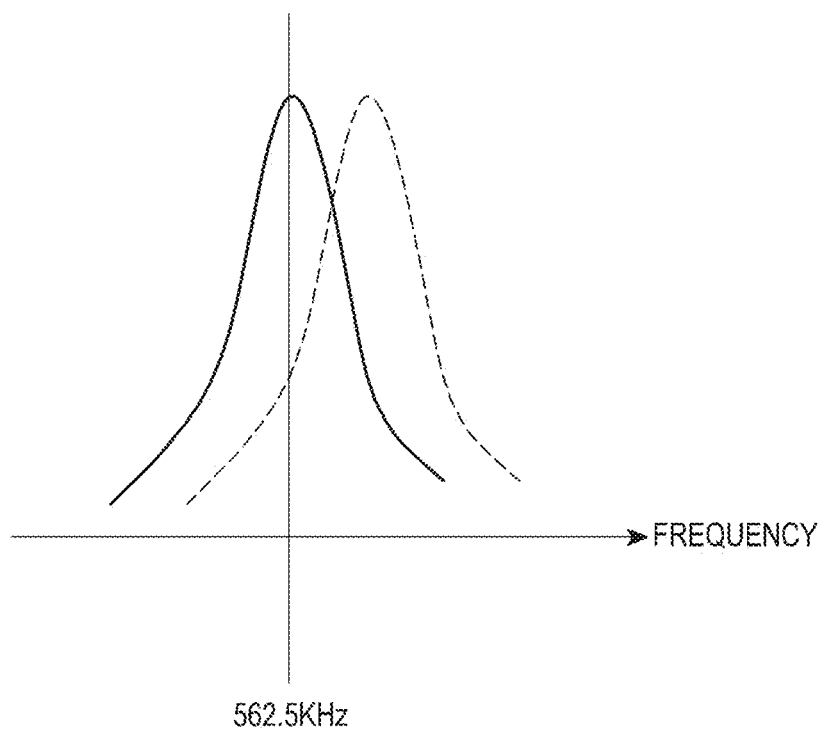
FIG. 2 is a graph illustrating the resonant frequency of a resonance circuit according to an embodiment of the present disclosure.

As illustrated in FIG. 2, the specified resonant frequency may be, for example, 562.5 KHz, and a different resonant frequency (and/or resonant frequency band) may be specified to the resonance circuit 16 of the flip cover 10 according to the type of the flip cover 10. Further, the resonant frequency (and/or resonant frequency band) of the flip cover 10 may be specified so as to be distinguished from a specified resonant frequency (and/or resonant frequency band) of an electronic pen (not illustrated) that includes a resonance circuit so that the electronic device 100 can distinguish between the electronic pen and the flip cover 10.

In addition, the flip cover 10 may include a magnetic element (not illustrated), and the magnetic element may be installed at a location that corresponds to a detection unit, for example a Hall integrated circuit, of the electronic device 100, which will be described below. The flip cover 10 may be classified into various types, and the resonant frequency of the resonance circuit may be differently specified according to the types of the flip cover 10 as described above so that the electronic device 100 can identify the type of the flip cover 10 by identifying the resonant frequency of the resonance circuit of the flip cover 10. For example, at least one of the resonant frequency, the resonant frequency band, and the output location (the location of the resonance circuit) of the resonance signal of the resonance circuit may have been specified according to the type of the flip cover 10.

Figure 3A:
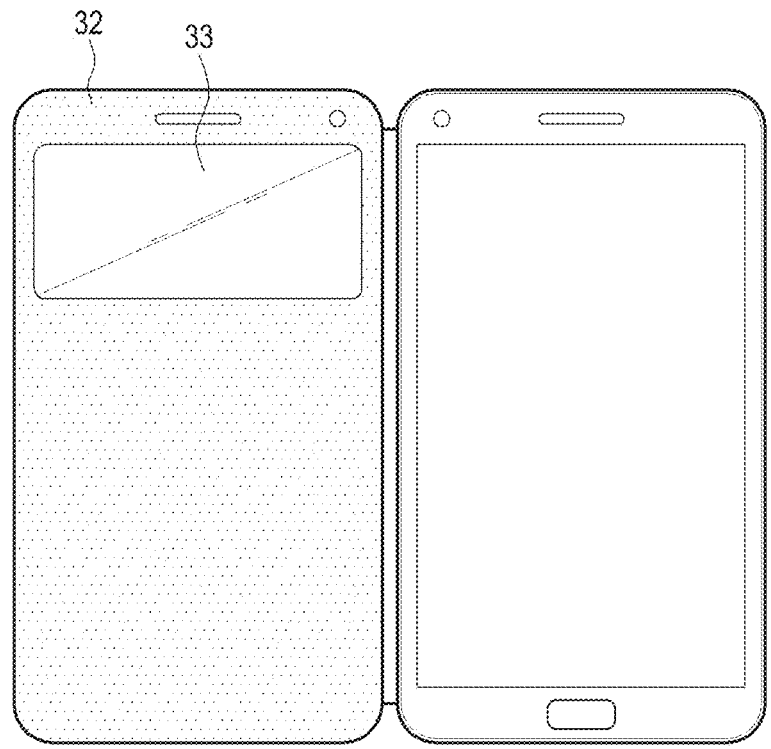
FIGS. 3A and 3B illustrate types of flip covers according to embodiments of the present disclosure.
Figure 3B:
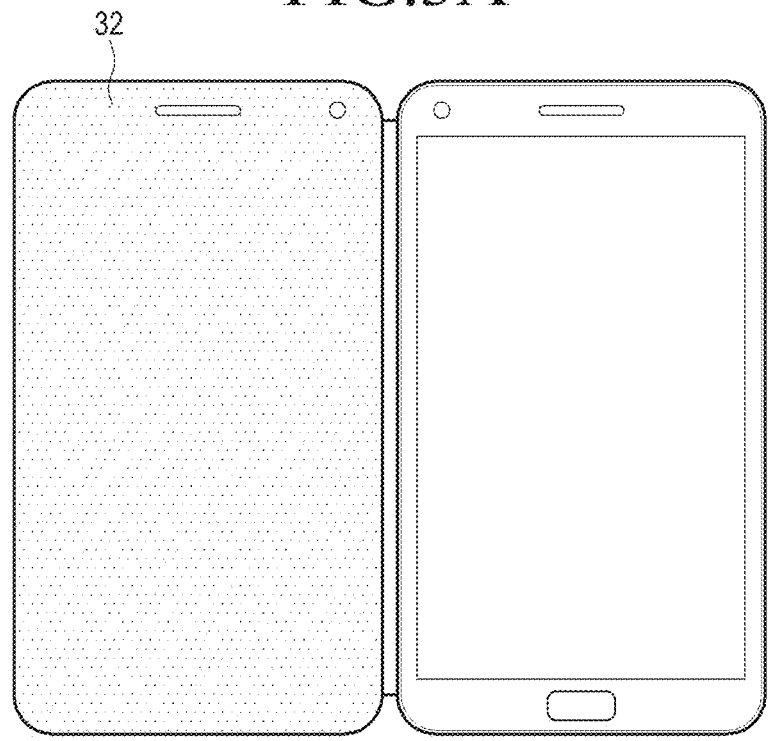

As illustrated in FIG. 3A, the flip cover 10 may include, for example, a clear cover that includes a window region 33, at least a part of which is formed of a transparent or translucent material, or is open. Further, the flip cover 10 may be classified into various types according to the location of the window region 33 of the clear cover. For example, the flip cover 10 may be classified into a clear cover in which the window region 33 is located on the upper side of a front cover 32, a clear cover in which the window region 33 is located on the lower side of the front cover 32, a clear cover in which the window region 33 is located on the left side of the front cover 32, a clear cover in which the window region 33 is located on the right side of the front cover 32, and the like. In addition, as illustrated in FIG. 3B, the flip cover 10 may include, for example, a book cover in which the whole front cover 32 is formed of an opaque material.

Also, the flip cover 10 may include, for example, a genuine flip cover that has been certified as a genuine product. The genuine flip cover may include all flip covers that include a resonance circuit that is set to a specified resonant frequency in one of the frequency bands stored in the electronic device 100. Further, for example, the genuine flip cover may include the clear cover and the book cover, which have been described above. In addition, the flip cover 10 may include a non-genuine flip cover that has not been certified as a genuine product, and the electronic device may determine the flip cover 10 from which a specified resonant frequency is not detected to be a non-genuine flip cover.

Figure 4:
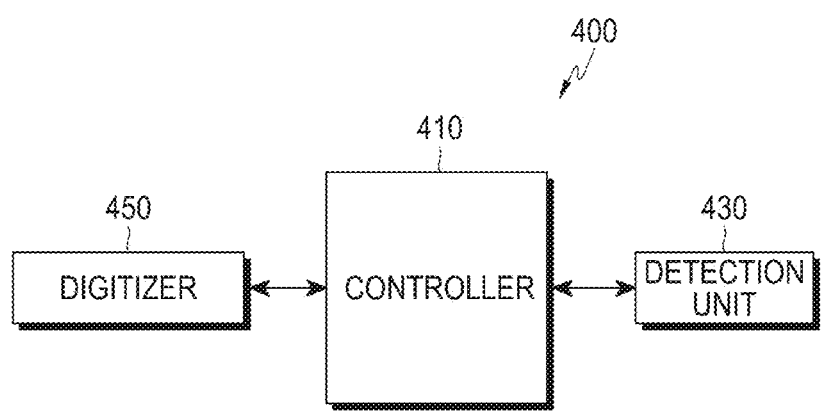
FIG. 4 is a block diagram of an electronic device according to an embodiment of the present disclosure.

FIG. 4 is a block diagram of an electronic device according to an embodiment of the present disclosure. Referring to FIG. 4, the electronic device 400 (e.g., the electronic device 100) may include a controller 410, a detection unit 430, and a digitizer 450, and the digitizer 450 may be, for example, a touch screen. The detection unit 430 may sense the front side of a flip cover that covers the front side of the electronic device 400 on which the digitizer 450 is located, and may output a value according to the sensing (also referred to as an output value).

For example, the detection unit 430 may include an element that is installed at a location corresponding to a magnetic element of the flip cover to detect a magnetic force; for example, a Hall integrated circuit. The Hall integrated circuit may detect an external magnetic force; for example, the magnetic force of the magnetic element of the flip cover. Accordingly, the controller 410 of the electronic device 400 may determine whether the flip cover covers the front side of the electronic device 400 according to the magnetic force detected by the detection unit 430. Further, the detection unit 430 may also include a proximity detection sensor, and the like that detects the degree to which an object closely approaches the electronic device.

Figure 5A:
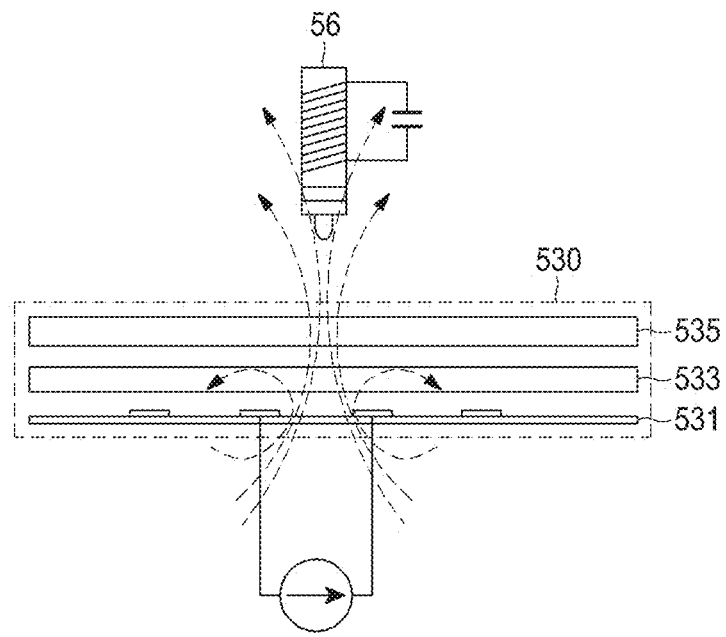
FIGS. 5A, 5B, and 6 are views for explaining an operating principle of recognizing a flip cover by a digitizer of an electronic device according to an embodiment of the present disclosure.
Figure 5B:
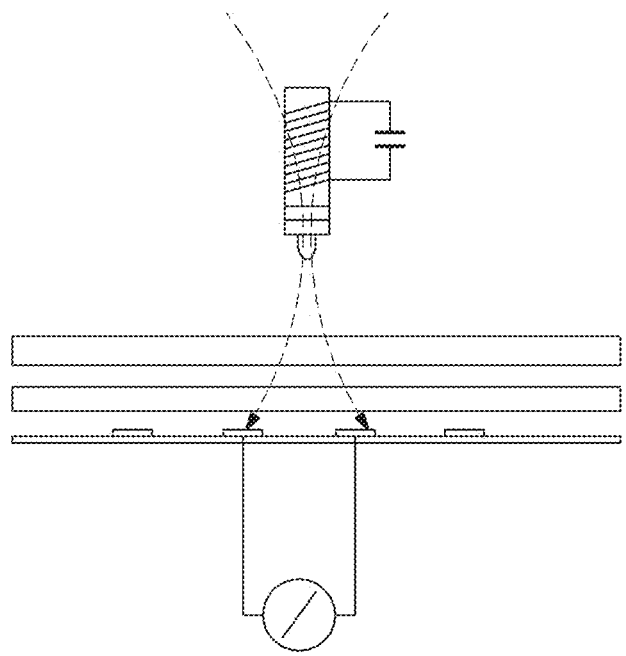
Figure 6:
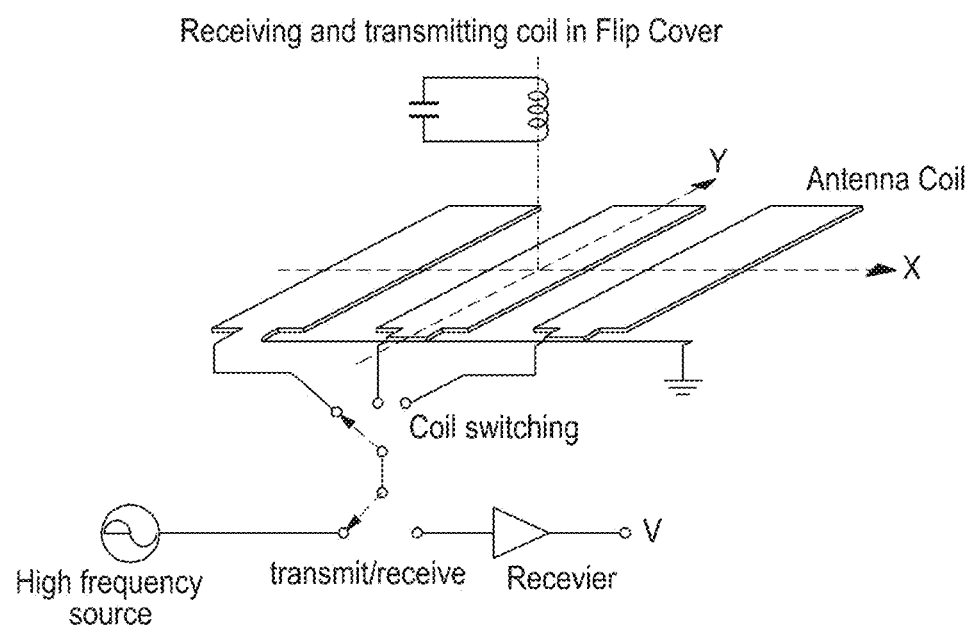

A sensor substrate on which loop coils are arranged may be applied to the digitizer 450 such that the digitizer 450 may operate in an Electro-Magnetic Resonance (EMR) detection scheme. Referring to FIGS. 5A and 5B, a digitizer 530 (e.g., the digitizer 450) may include an EMR detection panel 531 and a display panel 533 that is provided above the EMR detection panel 531. In addition, the digitizer 530 may include a window 535 that is provided above the display panel 533. The EMR detection panel 531 may include a resonance circuit that receives electric power from a high-frequency source and radiates a predetermined resonance signal to a predetermined region under the control of a controller (e.g., the controller 410) of an electronic device (e.g., the electronic device 400) as illustrated in FIG. 6. Further, the EMR detection panel 531 may be configured such that a plurality of loop coil patterns that generate a magnetic field of a preset resonant frequency cross each other in the horizontal and vertical directions. In addition, the EMR detection panel 531 may repetitively perform an operation of applying AC power of a resonant frequency in order to generate a magnetic field and an operation of detecting the magnetic field of the resonant frequency, which is generated in a flip cover, while sequentially selecting the plurality of loop coil patterns through coil switching.

The display panel 533 may receive a control signal or a graphic signal from the outside and may display a relevant image. The window 535 may be formed of a reinforced glass, and the like that forms the outer periphery layer of the digitizer 530. In the above-described EMR detection scheme, a plurality of coils are mounted on a substrate, and the location of a resonance circuit 56 is identified by detecting an electromagnetic change generated by the approach of the resonance circuit. Therefore, as opposed to a resistive scheme, the EMR detection panel 531 does not necessarily have to be disposed above the display panel 533, and may be provided below the display panel 533. Further, the digitizer may also be provided in the form of a multi-input device (not illustrated) in which a capacitive type detection panel (not illustrated) that can detect contact between a user's finger and the EMR detection panel 531 of an EMR type operates at the same time. The multi-input device may include, for example, a display panel provided above an EMR detection panel, and a capacitive type detection panel that is provided above the display panel and measures a change in an electrostatic capacity at a point that a user's finger makes contact in order to measure the input point of the finger.

The controller 410 may control the detection unit 430 and the digitizer 450. According to an embodiment of the present disclosure, the controller 410 may determine the type of the flip cover by identifying at least one of the resonant frequency of a resonance signal output from a resonance circuit included in the flip cover and the location of the resonance signal that is recognized by the digitizer 450. For example, the controller 410 may detect the resonance signal output from the resonance circuit included in the flip cover while the flip cover covers the front side of the electronic device 400. For example, the controller 410 may identify the resonant frequency of the resonance circuit of the flip cover and may determine the type of the flip cover according to the identified resonant frequency while the flip cover covers the front side of the electronic device 400 on which the digitizer 450 is located.

Further, the controller 410 may determine whether the flip cover covers the front side of the electronic device based on an output value according to the sensing of the detection unit 430. For example, in cases where the detection unit 430 is an element for detecting an external magnetic force, when the front side of the electronic device 400 is covered with the front cover of the flip cover, the detection unit 430 may detect a magnetic force of a magnetic element mounted on the flip cover, and the controller 410 may determine that the front side of the electronic device is covered with the flip cover based on the magnetic force detected by the detection unit 430.

An operating principle of recognizing the flip cover by the digitizer 530 of the electronic device will be described below in detail with reference to FIG. 5. When the resonance circuit 56 of the flip cover enters a predetermined region where a predetermined resonance signal radiated by the EMR pad 531 of the digitizer 530 exists, the resonance circuit of the EMR pad 531 and the resonance circuit 56 of the flip cover are electromagnetically connected to each other. Accordingly, the predetermined resonance signal is induced in the resonance circuit 56 of the flip cover, and a magnetic field is generated around a core by the resonance circuit 56 of the flip cover as illustrated in FIG. 5B. Therefore, the EMR pad 531 may identify the location of the magnetic field generated by the resonance circuit 56 of the flip cover and may measure an induced current of the magnetic field under the control of the controller of the electronic device.

Figure 7:
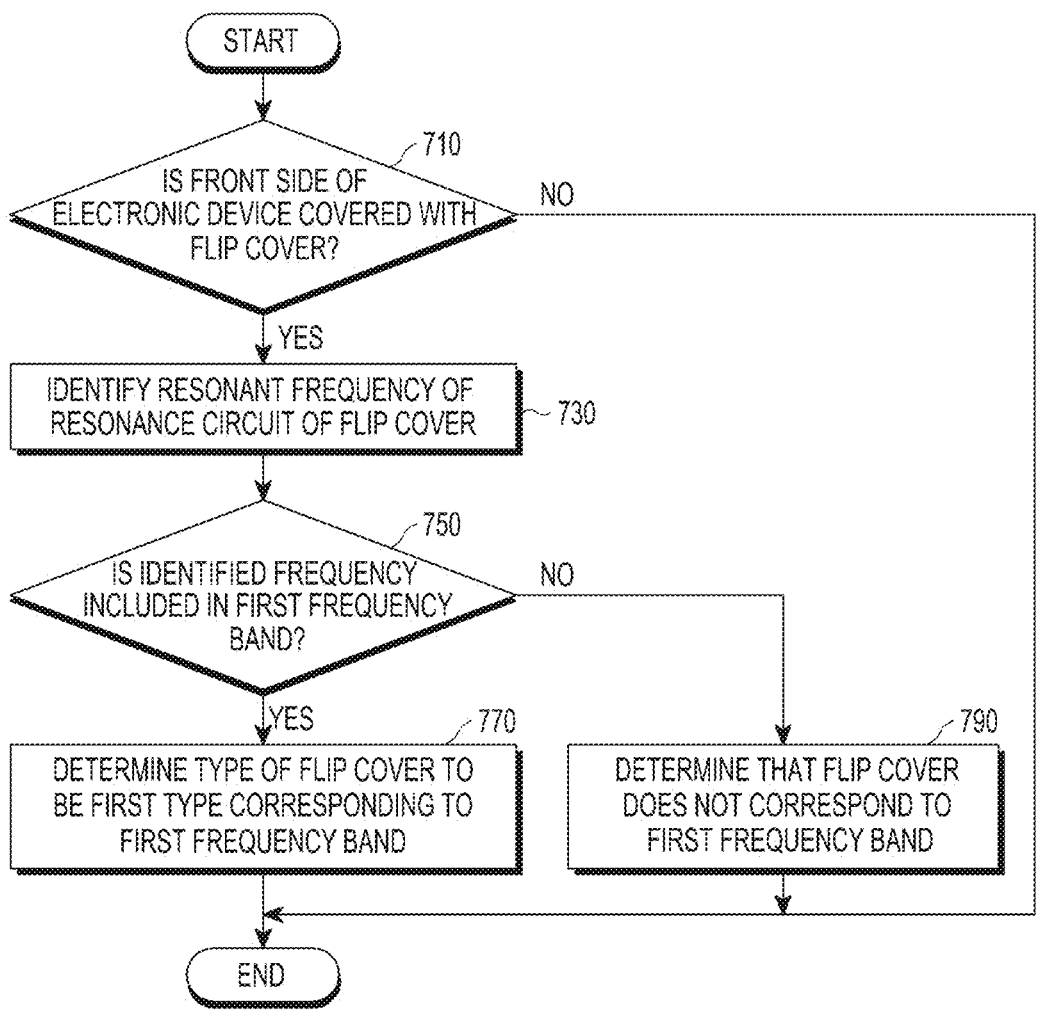
FIG. 7 is a flowchart illustrating an operation of recognizing a flip cover of an electronic device according to an embodiment of the present disclosure.

FIG. 7 is a flowchart illustrating an operation of recognizing a flip cover of an electronic device according to an embodiment of the present disclosure. Referring to FIG. 7, the electronic device may detect at least one of the resonant frequency of a resonance signal output from a resonance circuit of the flip cover, which is located adjacent to the electronic device, and the location of the resonance signal recognized by a digitizer of the electronic device, and may determine the type of the flip cover of the electronic device by using at least one of the resonant frequency of the resonance signal output from the resonance circuit and the location of the resonance signal recognized by the digitizer. For example, while the flip cover covers the front side of the electronic device on which the digitizer is mounted, the electronic device may identify the resonant frequency of the resonance circuit of the flip cover and may determine the type of the flip cover according to the identified resonant frequency.

In operation 710, the electronic device may determine whether the front side of the electronic device has been covered with the flip cover. When the determination result in operation 710 shows that the front side of the electronic device has been covered with the flip cover, the electronic device may proceed to operation 730, and if not, the electronic device may complete the operation of the present disclosure. For example, when the front side of the electronic device is covered with the flip cover, a detection unit of the electronic device, for example, a Hall integrated circuit may detect a magnetic force of a magnetic field of a magnetic element mounted on the flip cover, and the electronic device may determine whether the front side of the electronic device has been covered with the flip cover based on the detected magnetic force. In operation 730, the electronic device may identify the resonant frequency of the resonance circuit of the flip cover.

In order to identify the resonant frequency of the resonance circuit of the flip cover, the electronic device may identify whether a specific resonant frequency is recognized in a specified region (also referred to as a location) of the digitizer. The specified region may be a region that is set to correspond to the location of the resonance circuit of the flip cover. Meanwhile, the location of the resonance circuit may be differently set according to the type of the flip cover, which will be described below.

For example, when the front side of the electronic device is covered with the flip cover that has a specified resonant frequency, the resonance circuit of the flip cover enters a specified region where a predetermined resonance signal exists, which is radiated by an EMR pad of the digitizer to which a current is applied, and a resonance circuit of the EMR pad and the resonance circuit of the flip cover are electromagnetically connected to each other. In this state, the electronic device may detect an induced current of a magnetic field generated by the resonance circuit of the flip cover and may identify the resonant frequency of the induced current.

In operation 750, the electronic device may identify whether the identified resonant frequency is in a first resonant frequency band. When the determination result in operation 750 shows that the identified resonant frequency is in the first resonant frequency band, the electronic device may proceed to operation 770, and if not, the electronic device may proceed to operation 790. For example, resonant frequencies (and/or resonant frequency bands) of resonance circuits of flip covers may be differently specified, and resonant frequency band information corresponding to the resonance circuits of the respective flip covers (resonant frequency band information that includes the resonant frequencies of the resonance circuits of the flip covers) may be stored in the electronic device in order to identify the type of the flip cover.

In operation 770, the electronic device may determine the type of the flip cover to be a first type that corresponds to the first resonant frequency band. For example, a flip cover that has a resonant frequency included in the first resonant frequency band may have been specified as a genuine flip cover, and accordingly, the first type of the flip cover may be a genuine flip cover. Also, for example, a flip cover that has a resonant frequency included in the first resonant frequency band may have been specified as a clear cover or a book cover, and accordingly, the first type of the flip cover may be a clear cover, a book cover, or the like. In addition, for example, a flip cover that has a resonant frequency included in the first resonant frequency band may be a clear cover in which a window region is located on the upper side of a front cover, a clear cover in which a window region is located on the lower side of a front cover, a clear cover in which a window region is located on the left side of a front cover, a clear cover in which a window region is located on the right side of a front cover, or the like.

In operation 790, the electronic device may determine that the flip cover does not correspond to the first resonant frequency band. For example, the electronic device may deteinfine the flip cover, which does not correspond to the first resonant frequency band, to be a non-genuine flip cover that is not certified as a genuine product. In addition, for example, the electronic device may determine the flip cover, which does not correspond to the first resonant frequency band, to be a second type flip cover that corresponds to a second resonant frequency band. The flip cover determined to be the second type (also referred to as the second type flip cover) may be distinguished from the flip cover determined to be the first type (the first type flip cover). For example, the first type flip cover may be a clear cover, and the second type flip cover may be a book cover. In addition, for example, the second type flip cover may be a clear cover or a book cover. Further, the second type flip cover may be, for example, a clear cover in which a window region is located on the lower side of a front cover, a clear cover in which a window region is located on the left side of a front cover, a clear cover in which a window region is located on the right side of a front cover, or the like.

Figure 8A:
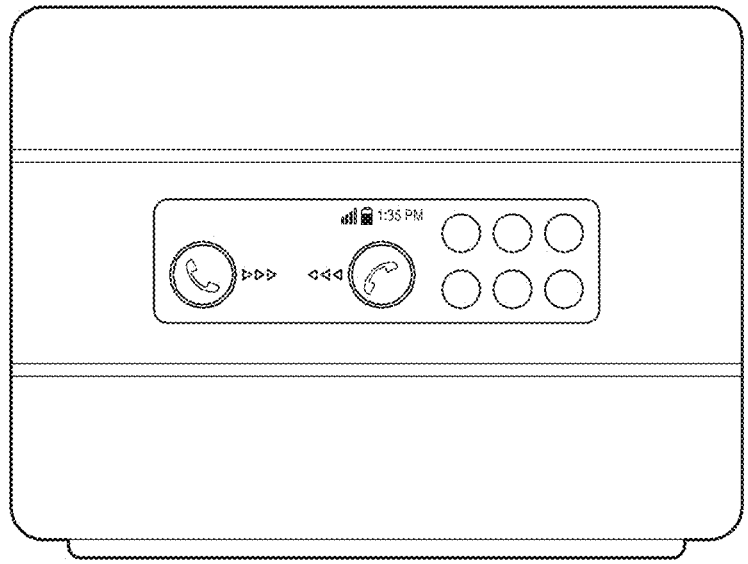
FIGS. 8A and 8B illustrate an operation of an electronic device on which a clear cover is mounted according to an embodiment of the present disclosure.
Figure 8B:
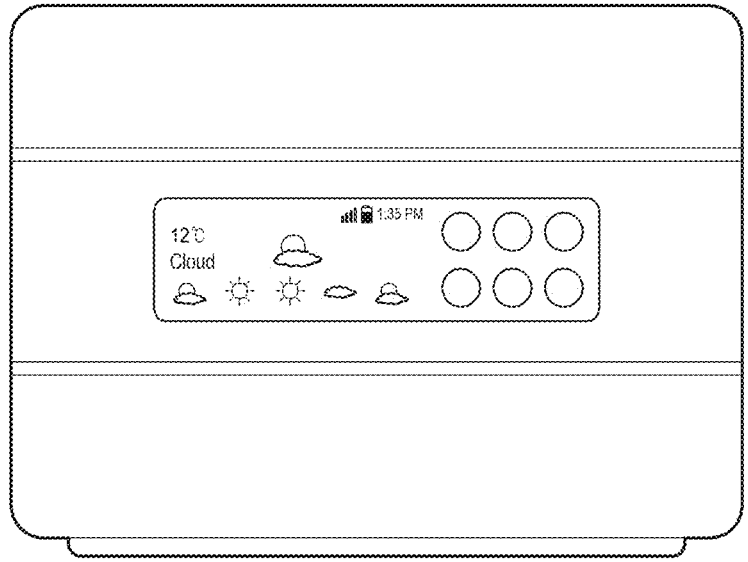

When the electronic device identifies the type of the flip cover, which covers the electronic device, according to the above-described operation, the electronic device may control an operation thereof to correspond to the type of the flip cover. For example, when the electronic device determines the type of the flip cover, which covers the electronic device, to be a clear cover, the electronic device may display specified information on a portion of the digitizer of the electronic device that is shown through a window region of a front cover that is formed of a transparent or translucent material, or is open as illustrated in FIGS. 8A and 8B.

In addition, for example, when a specific event occurs in the electronic device covered with the flip cover while the electronic device determines the type of the flip cover, which covers the electronic device, to be a clear cover, the electronic device may display information relevant to the specific event on a portion of the digitizer of the electronic device that is shown through the window region of the front cover. The event may include, for example, a predetermined button input event, a received event, a notification event, and the like. The received event may include, for example, a call reception event or a message reception event. The notification event may include, for example, a time notification event, a schedule notification event, and the like.

Furthermore, when a specific event occurs in the electronic device covered with the flip cover, the electronic device may identify the type of the flip cover, and in cases where the type of the flip cover is determined to be a clear cover, the electronic device may display information relevant to the specific event on a portion of the digitizer of the electronic device that is shown through the window region of the front cover.

In cases where the electronic device covered with the flip cover determines the flip cover to be a non-genuine flip cover, the electronic device may be set to not operate even though a specific event occurs. Meanwhile, according to another embodiment of the present disclosure, when the electronic device identifies that the resonant frequency of the resonance circuit of the flip cover is included in the first resonant frequency band without a separate operation of identifying whether the front side of the electronic device is covered with the flip cover, the electronic device may determine the type of the flip cover to be the first type relevant to the first resonant frequency band at the same time as identifying that the front side of the electronic device is covered with the flip cover.

Figure 9:
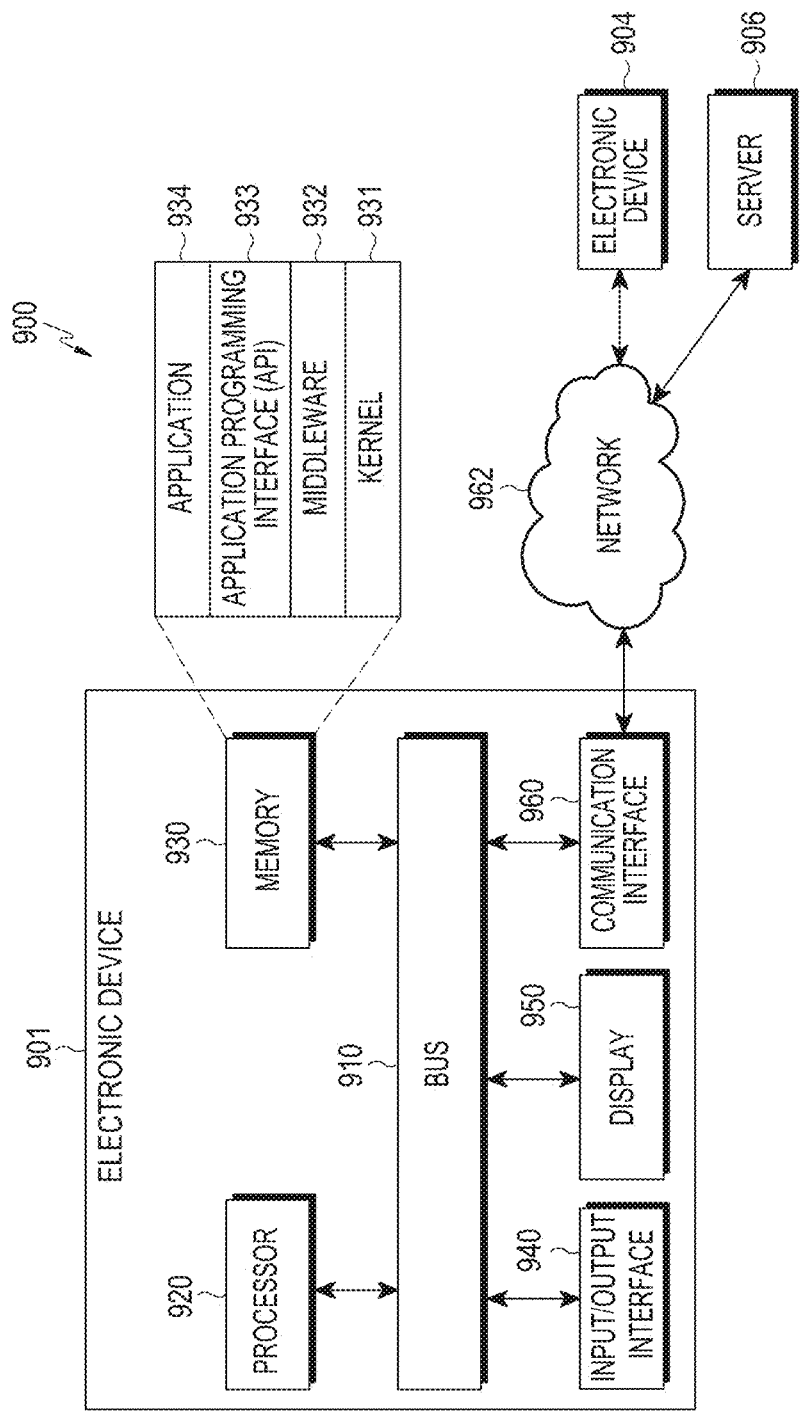
FIG. 9 is a block diagram of a network environment that includes an electronic device according to various embodiments of the present disclosure.

FIG. 9 is a block diagram of a network environment that includes an electronic device according to various embodiments of the present disclosure. Referring to FIG. 9, the electronic device 901 may include a bus 910, a processor 920, a memory 930, an input/output interface 940, a display 950, a communication interface 960. The bus 910 may be a circuit that interconnects the elements of the electronic device 901 and transfers communication (e.g., a control message) between the elements.

The processor 920 may, for example, receive commands from the other elements (e.g., the memory 930, the input/output interface 940, the display 950, the communication interface 960, the sensor module 970, and the like) through the bus 910, may decode the received commands, and may execute operations or data processing based on the decoded commands. The memory 930 may store commands or data received from, or generated by, the processor 920 or the other elements (e.g., the input/output interface 940, the display 950, and the communication interface 960, the sensor module 970, and the like). The memory 930 may include, for example, programming modules 900, such as a kernel 931, middleware 932, an Application Programming Interface (API) 933, applications 934, and the like. Each of the programming modules may be configured with software, firmware, hardware, or a combination of two or more thereof.

The kernel 931 may control or manage system resources (e.g., the bus 910, the processor 920, the memory 930, and the like) that are used to execute operations or functions implemented in the other programming modules; for example, the middleware 932, the API 933, and the applications 934. Further, the kernel 931 may provide an interface by which the middleware 932, the API 933, or the applications 934 access individual elements of the electronic device 901 to control or manage the elements.

The middleware 932 may function as an intermediary that makes the API 933 or the applications 934 communicate with the kernel 931 to exchange data. Further, in regard to task requests received from the applications 934, the middleware 932 may, for example, execute a control (e.g., scheduling or load balancing) for the task requests by using a method of assigning a priority to use system resources of the electronic device 901 (e.g., the bus 910, the processor 920, the memory 930, and the like) to at least one of the applications 934. The API 933 is an interface used, by the applications 934, to control a function provided from the kernel 931 or the middleware 932, and may include, for example, at least one interface or function (e.g., instruction) for file control, window control, image processing, text control, and the like.

According to various embodiments, the applications 934 may include a short message service (SMS)/multimedia message service (MMS) application, an e-mail application, a calendar application, an alarm application, a health care application (e.g., an application for measuring a work rate or blood sugar), an environment information application (e.g., an application for providing atmospheric pressure, humidity, temperature information, and the like), and the like. Additionally or alternatively, the applications 934 may be an application associated with information exchange between the electronic device 901 and an external electronic device (e.g., an electronic device 904). The application associated with the exchange of information may include, for example, a notification relay application for transferring specific information to an external electronic device, or a device management application for managing an external electronic device.

For example, the notification relay application may have a function of forwarding, to an external electronic device (e.g., the electronic device 904), notification information generated from other applications of the electronic device 901 (e.g., an SMS/MMS application, an e-mail application, a health care application, an environmental information application, and the like). Additionally or alternatively, the notification relay application may, for example, receive notification information from an external electronic device (e.g., the electronic device 904) and may provide the received notification information to a user. The device management application may, for example, manage (e.g., install, delete, or update) a function for at least a part of an external electronic device (e.g., the electronic device 904) that communicates with the electronic device 901 (e.g., a function of activating/deactivating the external electronic device itself (or some components thereof) or a function of adjusting the brightness (or resolution) of a display), an application that operates in the external electronic device, or a service provided by the external electronic device (e.g., a telephone call service or a message service).

According to various embodiments, the applications 934 may include an application that is specified according to the property (e.g., type) of an external electronic device (e.g., the electronic device 904). For example, in cases where the external electronic device is an MP3 player, the applications 934 may include an application relating to the reproduction of music. Similarly, in cases where the external electronic device is a mobile medical device, the applications 934 may include an application relating to health care. According to an embodiment, the applications 934 may include at least one of an application specified to the electronic device 901 and an application received from an external electronic device (e.g., a server 906 or the electronic device 904).

The input/output interface 940 may transfer a command or data, which is input by a user through an input/output device (e.g., a sensor, a keyboard, or a touch screen), to the processor 920, the memory 930, the communication interface 960, and the sensor module 970, for example, through the bus 910. For example, the input/output interface 940 may provide, to the processor 920, data on a user's touch that is input through a touch screen. The input/output interface 940 may, for example, output commands or data, which are received through the bus 910 from the processor 920, the memory 930, the communication interface 960, and the sensor module 970, through an input/output device (e.g., a speaker or a display).

The display 950 may display various types of information (e.g., multimedia data, text data, and the like) to a user. The communication interface 960 may connect communication between the electronic device 901 and an external device (e.g., the electronic device 904 or the server 906). For example, the communication interface 960 may be connected to a network 962 through wireless or wired communication to communicate with the external device. The wireless communication may include, for example, at least one of Wi-Fi, BLUETOOTH™ (BT), Near Field Communication (NFC), a Global Positioning System (GPS), and cellular communication (e.g., LTE, LTE-A, CDMA, WCDMA, UMTS, WiBro, GSM, etc.). The wired communication may include, for example, at least one of a Universal Serial Bus (USB), a High Definition Multimedia Interface (HDMI), Recommended Standard 232 (RS-232), and a Plain Old Telephone Service (POTS).

According to an embodiment, the network 962 may be a telecommunication network. The telecommunication network may include at least one of a computer network, the Internet, Internet of Things, and a telephone network. According to an embodiment, a protocol (e.g., a transport layer protocol, a data link layer protocol, or a physical layer protocol) for communication between the electronic device 901 and an external device may be supported by at least one of the applications 934, the API 933, the middle ware 932, the kernel 931, and the communication interface 960.

Figure 10:
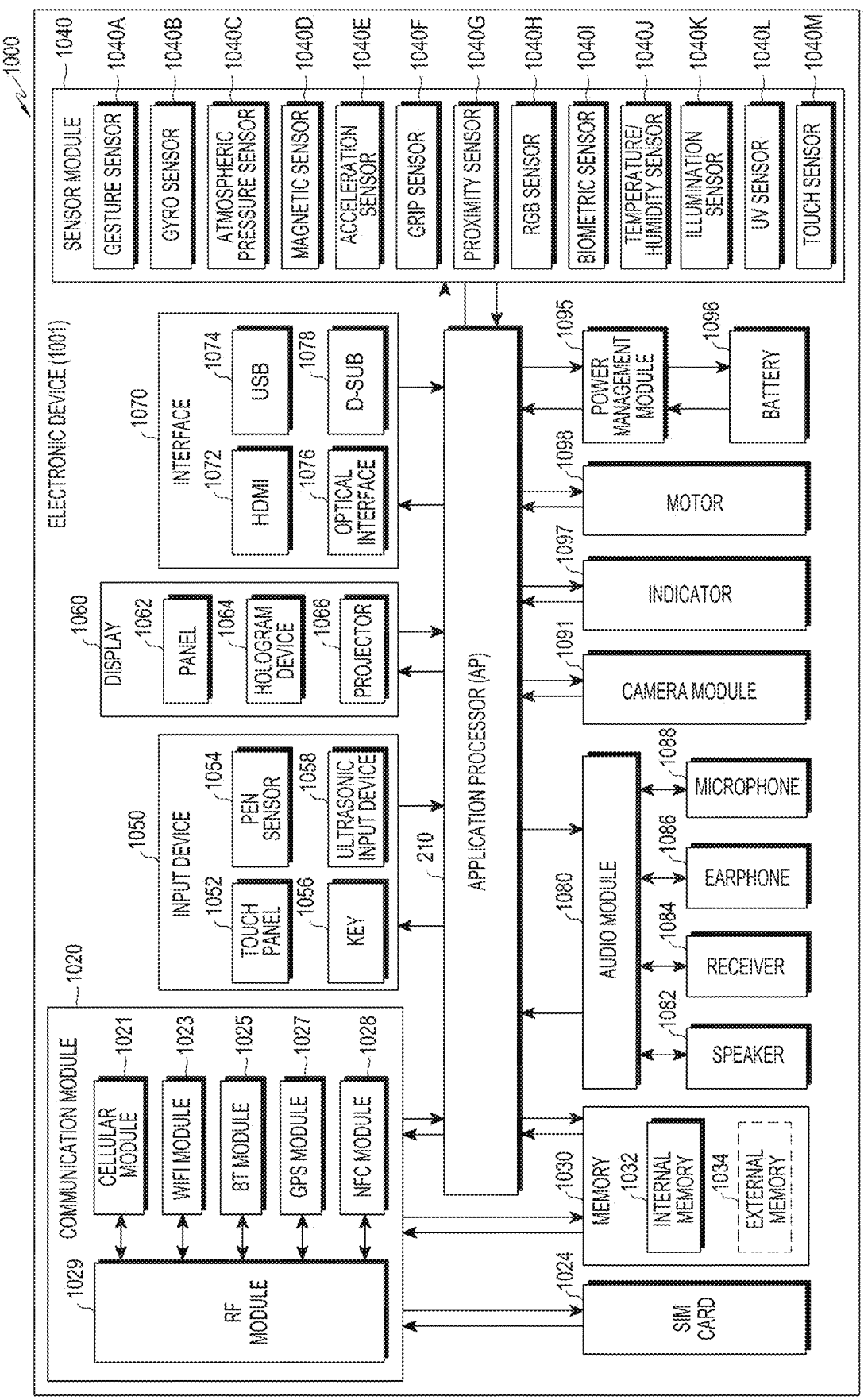
FIG. 10 is a block diagram of an electronic device according to various embodiments of the present disclosure.
Figure 11A:
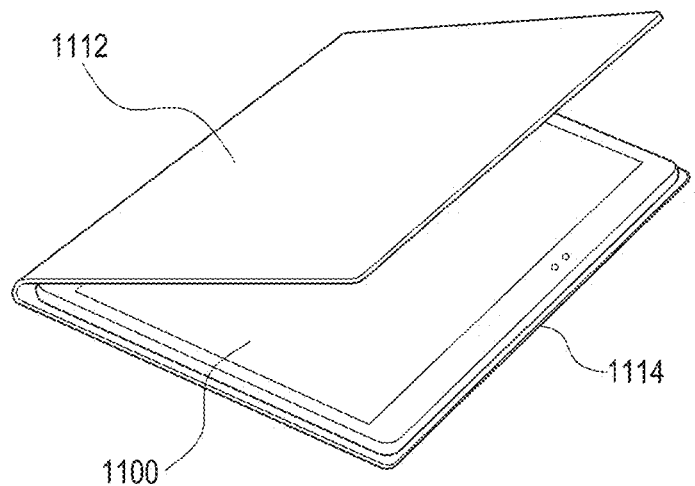
FIGS. 11A, 11B, and 12 illustrate flip covers according to various embodiments of the present disclosure.
Figure 11B:
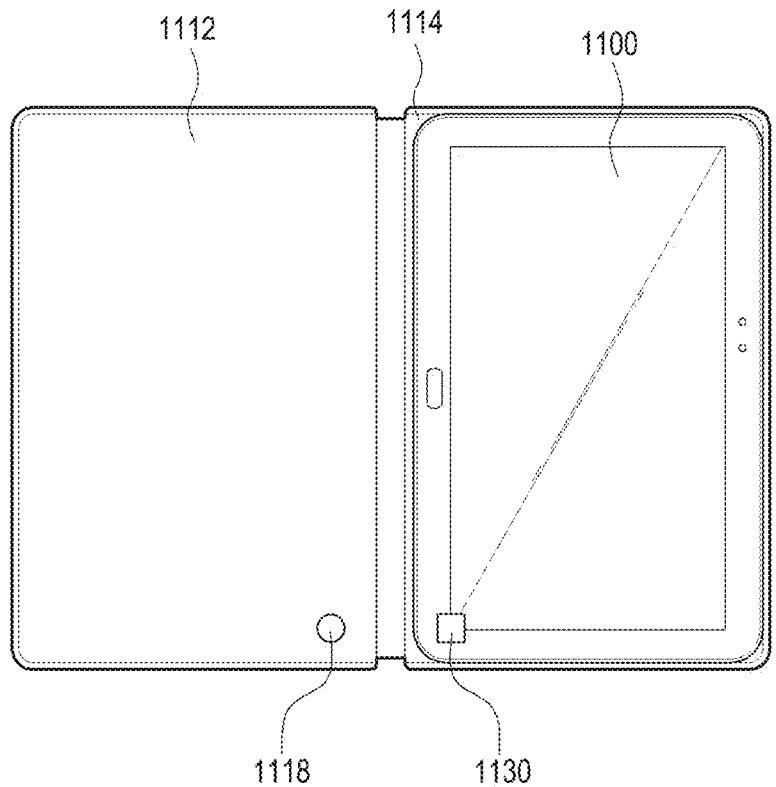
Figure 12:
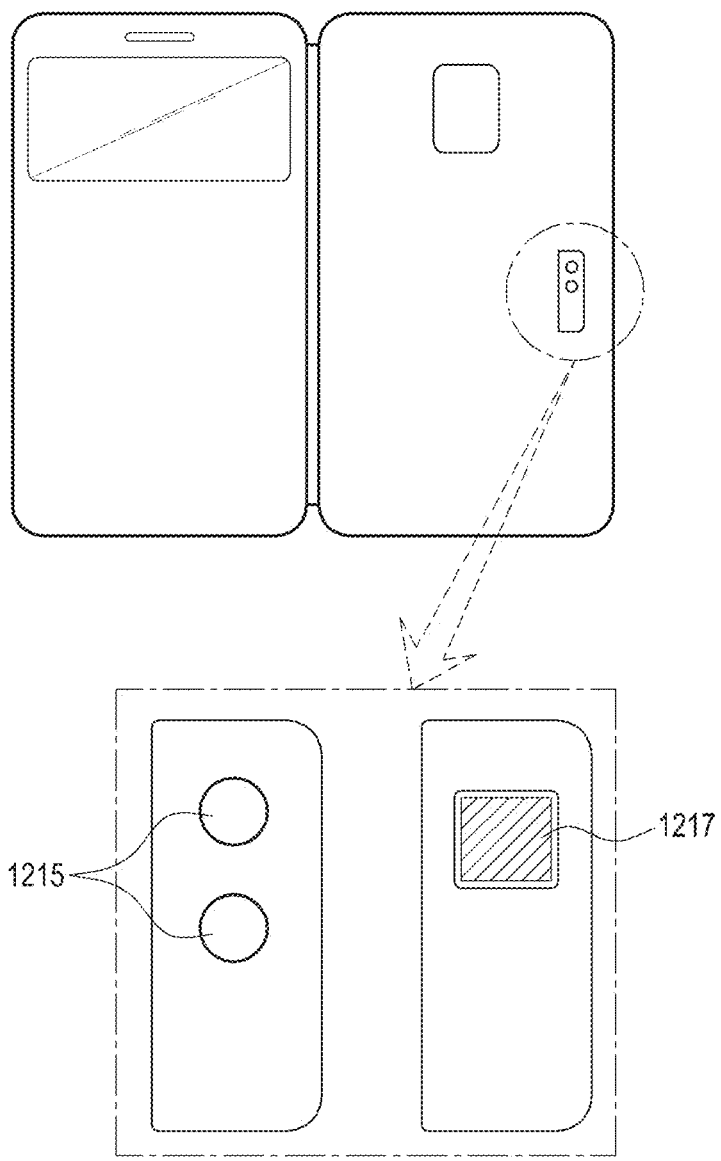

FIG. 10 is a block diagram of an electronic device according to various embodiments of the present disclosure.

The electronic device 1000 may constitute, for example, the entirety or a part of the electronic device 1000 illustrated in FIG. 10. Referring to FIG. 10, the electronic device 1000 may include at least one Application Processor (AP) 210, a communication module 1020, a Subscriber Identification Module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may control a plurality of hardware or software elements connected thereto by driving an operating system or an application program, and may perform processing and operations on various types of data that includes multimedia data. The AP 1010 may be embodied as, for example, a System on Chip (SoC). According to an embodiment, the AP 1010 may further include a Graphic Processing Unit (GPU, not illustrated).

The communication module 1020 (e.g., the communication interface 960) may transmit and receive data during communication between the electronic device 1000 (e.g., the electronic device 901) and other electronic devices (e.g., the electronic device 904, the server 906, and a social search engine) that are connected thereto over a network. According to an embodiment, the communication module 1020 may include a cellular module 1021, a Wi-Fi module 1023, a BT module 1025, a GPS module 1027, an NFC module 1028, and a Radio Frequency (RF) module 1029.

The cellular module 1021 may provide a voice call, a video call, a text service, an Internet service, and the like through a communication network (e.g., LTE, LTE-A, CDMA, WCDMA, UMTS, WiBro, GSM, and the like). Further, the cellular module 1021 may identify and authenticate the electronic device in a communication network by using, for example, a subscriber identification module (e.g., the SIM card 1024). According to an embodiment, the cellular module 1021 may perform at least some of the functions which the AP 1010 may provide. For example, the cellular module 1021 may perform at least a part of a multimedia control function.

According to an embodiment, the cellular module 1021 may include a Communication Processor (CP). Further, the cellular module 1021 may be embodied as, for example, an SoC. Although the elements, such as the cellular module 1021 (e.g., communication processor), the memory 1030, the power managing module 1095, and the like, are illustrated as separate elements from the AP 1010 in FIG. 10, the AP 1010 may be implemented to include at least some (e.g., the cellular module 1021) of the above-described elements according to an embodiment.

According to an embodiment, the AP 1010 or the cellular module 1021 (e.g., the communication processor) may load commands or data, which is received from a non-volatile memory or at least one of the other elements that are connected thereto, in a volatile memory and may process the loaded commands or data. Further, the AP 1010 or the cellular module 1021 may store data received from, or generated by, at least one of the other elements in a non-volatile memory.

The Wi-Fi module 1023, the BT module 1025, the GPS module 1027, or the NFC module 1028 may include, for example, a processor for processing data transmitted/received through the corresponding module. Although the cellular module 1021, the Wi-Fi module 1023, the BT module 1025, the GPS module 1027, and the NFC module 1028 are illustrated as separate blocks in FIG. 10, at least some (e.g., two or more) of the cellular module 1021, the Wi-Fi module 1023, the BT module 1025, the GPS module 1027, and the NFC module 1028 may be included within one Integrated Chip (IC) or one IC package according to an embodiment. For example, at least some of the processors that correspond to the cellular module 1021, the Wi-Fi module 1025, the BT module 1027, the GPS module 1028, and the NFC module 228 (e.g., a communication processor that corresponds to the cellular module 1021 and a Wi-Fi processor that corresponds to the Wi-Fi module 1023) may be implemented as one SoC.

The RF module 1029 may transmit/receive data, for example, an RF signal. Although not illustrated, the RF module 1029 may include, for example, a transceiver, a Power Amp Module (PAM), a frequency filter, a Low Noise Amplifier (LNA), or and the like. Further, the RF module 1029 may further include a component for transmitting/receiving electromagnetic waves in the air in radio communication, such as a conductor, a conducting wire, and the like. Although the cellular module 1021, the Wi-Fi module 1023, the BT module 1025, the GPS module 1027, and the NFC module 1028 are illustrated to share one RF module 1029 in FIG. 10, at least one of the cellular module 1021, the Wi-Fi module 1023, the BT module 1025, the GPS module 1027, and the NFC module 1028 may transmit/receive an RF signal through a separate RF module.

The SIM card 1024 may be a card that includes a subscriber identification module, and may be inserted into a slot formed at a specific location of the electronic device. The SIM card 1024 may include unique identification information (e.g., an Integrated Circuit Card Identifier (ICCID)) or subscriber information (e.g., an International Mobile Subscriber Identity (IMSI)).

The memory 1030 may include an internal memory 1032 or an external memory 1034. The internal memory 1032 may include, for example, at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 1032 may be a Solid State Drive (SSD). The external memory 1034 may further include a flash drive; for example, a Compact Flash (CF), a Secure Digital (SD), a Micro Secure Digital (Micro-SD), a Mini Secure Digital (Mini-SD), an extreme Digital (xD), a memory stick, and the like. The external memory 1034 may be functionally connected to the electronic device 1000 through various interfaces. According to an embodiment, the electronic device 1000 may further include a storage device (or storage medium), such as a hard disc drive.

The sensor module 1040 may measure a physical quantity or may detect an operating state of the electronic device 1000, and may convert the measured or detected information into an electrical signal. The sensor module 1040 may include, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., a Red/Green/Blue (RGB) sensor), a biometric sensor 1040I, a temperature/humidity sensor 1040J, an illumination sensor 1040K, an Ultra Violet (UV) sensor 1040L, and touch sensor 1040M. Additionally or alternatively, the sensor module 1040 may include, for example, an E-nose sensor (not illustrated), an electromyography (EMG) sensor (not illustrated), an electroencephalogram (EEG) sensor (not illustrated), an electrocardiogram (ECG) sensor (not illustrated), an infrared (IR) sensor (not illustrated), an iris sensor (not illustrated), a fingerprint sensor (not illustrated), and the like. The sensor module 1040 may further include a control circuit for controlling at least one sensor included therein.

The input device 1050 may include a touch panel 1052, a (digital) pen sensor 1054, a key 1056, or an ultrasonic input device 1058. The touch panel 1052 may recognize a touch input, for example, through at least one of a capacitive type, a resistive type, an infrared type, and an ultrasonic type. Further, the touch panel 1052 may further include a control circuit. A capacitive touch panel may recognize a physical contact or proximity. The touch panel 1052 may further include a tactile layer. In this case, the touch panel 1052 may provide a tactile reaction to a user.

The (digital) pen sensor 1054 may be embodied, for example, by using the same or a similar method to receiving a user's touch input, or by using a separate recognition sheet. The key 1056 may include, for example, a physical button, an optical key, or a keypad. The ultrasonic input device 1058 is a device capable of identifying data by detecting sound waves with a microphone (e.g., a microphone 1088) in the electronic device 1000 through an input tool that generates ultrasonic signals, thus allowing wireless recognition. According to an embodiment, the electronic device 1000 may also receive a user input from an external device (e.g., a computer or a server) connected thereto, using the communication module 1020.

The display 1060 (e.g., the display 950) may include a panel 1062, a hologram device 1064, or a projector 1066. The panel 1062 may be, for example, a Liquid Crystal Display (LCD), Active-Matrix Organic Light Emitting Diode (AM-OLED), and the like. The panel 1062 may be embodied to be, for example, flexible, transparent, or wearable. The panel 1062 along with the touch panel 1052 may also be configured as a single module. The hologram device 1064 may show a stereoscopic image in the air by using interference of light. The projector 1066 may project light onto a screen to display an image. For example, the screen may be located in the interior or on the exterior of the electronic device 1000. According to an embodiment, the display 1060 may further include a control circuit for controlling the panel 1062, the hologram device 1064, or the projector 1066.

The interface 1070 may include, for example, a High-Definition Multimedia Interface (HDMI) 1072, a Universal Serial Bus (USB) 1074, an optical interface 1076, or a D-subminiature (D-sub) 1078. Additionally or alternatively, the interface 1070 may include, for example, a Mobile High-definition Link (MHL) interface, a Secure Digital (SD) card/Multi-Media Card (MMC) interface, or an Infrared Data Association (IrDA) standard interface. The audio module 1080 may convert a sound into an electric signal, and vice versa. The audio module 1080 may process voice information input or output through, for example, a speaker 1082, a receiver 1084, earphones 1086, the microphone 1088, and the like.

The camera module 1091 is a device for capturing a still image or a moving image, and according to an embodiment, the camera module 1091 may include one or more image sensors (e.g., a front sensor or a rear sensor), a lens (not illustrated), an Image Signal Processor (ISP) (not illustrated), or a flash (not illustrated) (e.g., an LED or a xenon lamp). The power management module 1095 may manage the electric power of the electronic device 1000. Although not illustrated, the power management module 1095 may include, for example, a Power Management Integrated Circuit (PMIC), a charger Integrated Circuit (IC), or a battery or fuel gauge.

The PMIC may be mounted in, for example, an integrated circuit or an SoC semiconductor. Charging methods may be classified into a wired charging method and a wireless charging method. The charger IC may charge a battery and may prevent over-voltage or over-current from a charger. According to an embodiment, the charger IC may include a charger IC for at least one of the wired charging method and the wireless charging method. Examples of the wireless charging may include magnetic resonance charging, magnetic induction charging, and electromagnetic wave charging, and an additional circuit, such as a coil loop, a resonance circuit, a rectifier, and the like, may be added for the wireless charging.

The battery fuel gauge may measure, for example, the residual quantity of the battery 1096, a charging voltage and current, or temperature. The battery 1096 may store or generate electricity and may supply power to the electronic device 1000 by using the stored or generated electricity. The battery 1096 may include, for example, a rechargeable battery or a solar battery. The indicator 1097 may display a specific status, for example, a booting status, a message status, a charging status, and the like of the electronic device 1000 or a part thereof (e.g., the AP 1010). The motor 1098 may convert an electrical signal into a mechanical vibration. Although not illustrated, the electronic device 1000 may include a processing device (e.g., a GPU) for supporting mobile TV. The processing device for supporting mobile TV may process media data according to a standard of Digital Multimedia Broadcasting (DMB), Digital Video Broadcasting (DVB), media flow, and the like.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (e.g., modules or functions thereof) or methods (e.g., operations) according to the various embodiments of the present disclosure may be implemented as, for example, instructions stored computer readable storage media in the form of programming modules. When the command is executed by one or more processors, the one or more processors may perform a function corresponding to the command. The computer-readable storage medium may be, for example, the memory. At least some of the programming modules may be implemented (for example, executed) by, for example, the processor. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Embodiments of the present disclosure provided in the present specifications and drawings are merely certain examples to readily describe the technology associated with embodiments of the present disclosure and to help understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

It will be appreciated that the exemplary embodiments of the present disclosure may be implemented in a form of hardware, software, a combination of hardware and software. Regardless of being erasable or re-recordable, such an optional software may be stored in a non-volatile storage device such as a ROM, a memory such as an RAM, a memory chip, a memory device, or an integrated circuit, or a storage medium such as a CD, a DVD, a magnetic disc, or a magnetic tape that is optically or electromagnetically recordable and readable by a machine, for example, a computer. It is appreciated that the storage unit included in the electronic device is one example of the machine-readable storage media suitable for storing a program or programs including commands for implementing various embodiments of the present disclosure. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a touch screen; and
   a processor configured to:
      in response to identifying occurrence of an event in the electronic device, identify a type of a flip cover that comprises a resonance circuit among a plurality of predetermined flip cover types, wherein the type of the flip cover corresponds to at least one of a resonant frequency of a resonance signal from the resonance circuit recognized by the touch screen; and
      display, on a predetermined portion of the touch screen, information corresponding to the event of the electronic device based on the identified type of the flip cover,
   wherein the processor is further configured to:
      identify the type of the flip cover as a first type based on a first resonant frequency being included in a first resonant frequency band; or
      identify the type of the flip cover as a second type based on a second resonant frequency being included in a second resonant frequency band, the second type and the second resonant frequency band being different from the first type and the first resonant frequency band, respectively, and
      wherein the first type and the second type indicate at least one window region in which at least a part of the flip cover is formed of a transparent or translucent material, respectively.

2. The electronic device of claim 1, wherein the processor is configured to detect the resonance signal from the resonance circuit while a front side of the electronic device is covered with the flip cover.

3. The electronic device of claim 2, further comprising a detection device configured to sense the front side of the flip cover that covers the front side of the electronic device, wherein the processor is configured to determine whether the front side of the electronic device is covered with the flip cover based on an output value according to a result of sensing of the detection device.

4. The electronic device of claim 1, wherein the processor is configured to:
   detect an induced current of a magnetic field generated by the resonance circuit;
   identify a resonant frequency of the induced current; and
   identify the type of the flip cover according to the resonant frequency of the induced current.

5. The electronic device of claim 1, wherein the type of the flip cover comprises a magnetic element.

6. The electronic device of claim 1, wherein the occurrence of the event is identified in the electronic device while the touch screen is fully covered with a flip cover.

7. A flip cover comprising:
   a front cover configured to cover a touch screen provided on a front side of an electronic device, wherein the front cover comprises a resonance circuit that includes a structure configured to generate a resonance signal that is detected by the touch screen of the electronic device,
   wherein a type of the flip cover is identified by the electronic device identifying the type of the flip cover among a plurality of predetermined flip cover types, wherein the type of the flip cover corresponds to at least one of a resonant frequency of the resonance signal from the resonance circuit detected by the touch screen, wherein:
  the type of the flip cover is identified as a first type, by the electronic device, based on a first resonant frequency being included in a first resonant frequency band; or
  the type of the flip cover is identified as a second type, by the electronic device, based on a second resonant frequency being included in a second resonant frequency band, the first type and the first resonant frequency band being different from the second type and the second resonant frequency band, respectively,
wherein the first type and second type include at least one window region in which at least a part of the flip cover is formed of a transparent or translucent material, respectively, and wherein the type of the flip cover is used by the electronic device to display, on a predetermined portion of the touch screen corresponding the type of the flip cover, information corresponding to an event of the electronic device.

8. The flip cover of claim 7, wherein the flip cover comprises a magnetic element.

9. The flip cover of claim 7, wherein at least one of a resonant frequency of the resonance signal of the resonance circuit or a resonant frequency band of the resonance signal of the resonance circuit is specified according to the type of the flip cover.

10. The flip cover of claim 7, wherein the type of the flip cover comprises a genuine flip cover that is certified as a genuine product.

* * * * *